US005593543A

United States Patent [19]

Balos et al.

[11] Patent Number: 5,593,543
[45] Date of Patent: Jan. 14, 1997

[54] PROCESS FOR REPULPING WET STRENGTH PAPER

[75] Inventors: Barbara Balos, Newark, Del.; Nancy S. Clungeon, Wyndmoor, Pa.; James V. Patterson, Charlotte, N.C.; José M. Rodriguez, Fort Mill, S.C.; Stephen A. Fischer, Yardley, Pa.

[73] Assignee: Henkel Corporation, Plymouth Meeting, Pa.

[21] Appl. No.: 129,837

[22] Filed: Sep. 30, 1993

Related U.S. Application Data

[63] Continuation-in-part of Ser. No. 112,779, Aug. 26, 1993.

[51] Int. Cl.$^6$ .................................................. D21C 5/02
[52] U.S. Cl. ........................ 162/6; 162/7; 162/8; 162/78
[58] Field of Search ........................... 162/4, 5, 6, 8, 162/189–191, 73, 74–78

[56] References Cited

U.S. PATENT DOCUMENTS

| | | | |
|---|---|---|---|
| 2,904,515 | 9/1959 | Hanford | 162/74 |
| 3,069,307 | 12/1962 | Boaz | 162/5 |
| 3,377,235 | 4/1968 | Webster et al. | 162/191 |
| 3,407,113 | 10/1968 | Maxwell | 162/6 |
| 3,427,217 | 2/1969 | Miller | 162/6 |
| 3,619,347 | 11/1971 | Ireland, Jr. | 162/7 |
| 3,658,640 | 4/1972 | Coscia et al. | 162/4 |
| 4,162,186 | 7/1979 | Wood et al. | 162/5 |
| 4,445,971 | 5/1981 | Lappi et al. | 162/158 |
| 4,518,459 | 5/1985 | Freis et al. | 162/5 |
| 4,935,096 | 6/1990 | Gallagher et al. | 162/5 |
| 5,145,558 | 9/1992 | Christiansen et al. | 162/74 |
| 5,225,046 | 7/1993 | Borchardt | 162/5 |
| 5,282,928 | 1/1994 | Takahashi et al. | 162/5 |
| 5,447,602 | 9/1995 | Sajbel et al. | 162/6 |

OTHER PUBLICATIONS

Chlorine–free reagents for repulping alkaline–curing wet strength broke, by H. H. Espy, TAPPI Procedings, 190 Papermakers conference, pp. 147–149.

H. H. Espy et al., "Persulfates as Repulping Reagents for Neutral/Alkaline Wet-strength Broke", *Tappi Journal*, vol. 76, No. 2, pp. 139–141 (Feb. 1993).

P. C. Kapadia et al., "A Non–Chlorine Repulping Aide", (1992 Tappi Papermakers Conference).

*Primary Examiner*—Donald E. Czaja
*Assistant Examiner*—Jose A. Fortuna
*Attorney, Agent, or Firm*—Ernest G. Szoke; Wayne C. Jaeschke; Real J. Grandmaison

[57] ABSTRACT

Process for repulping wet strength paper containing at least one wet strength resin in which initial breakdown of the paper is conducted at a first pH and the substantial completion of the conversion to fibers is conducted at a second pH which is higher than the first pH.

14 Claims, No Drawings

PROCESS FOR REPULPING WET STRENGTH PAPER

This is a continuation-in-part application of J. Sajbel et al., U.S. patent application Ser. No. 08/112,779 filed on Aug. 26, 1993.

BACKGROUND OF THE INVENTION

1.0 Field Of The Invention

The present invention is generally directed to a process for repulping wet strength paper in which the reaction is conducted in a two step process wherein the initial breakdown of the wet strength paper to fibers is conducted at a first pH value and the remainder of the process is conducted at a second, higher pH value until the conversion to fibers is substantially complete.

2.0 Description Of Related Art

Wet strength paper contains a resin which is adsorbed onto paper fibers during the papermaking process and cross-links on heating or aging of the paper to form a polymeric network which adds strength to the paper. Wet strength resins fall into two groups, permanent and temporary, and include formaldehyde-based resins, amine-epichlorohydrin based resins and aldehyde polymers.

In order to repulp wet strength paper, it is necessary to hydrolyze the cured resin. For many years metal hypochlorites (e.g. sodium and potassium hypochlorite) have been used as reagents for repulping wet strength paper as shown by, for example, C. S. Maxwell, U.S. Pat. No. 3,407,113 and H. R. Miller, U.S. Pat. No. 3,427,217.

Hypochlorites generate adsorbable organic halides in paper mill effluents. These substances are environmentally undesirable. Accordingly, the papermaking industry has sought to use non-chlorinated reagents for repulping wet strength paper.

Alkali metal persulfates ($M_2S_2O_8$) and peroxymonosulfates ($MHSO_5$) have recently been used as reagents to replace hypochlorites. H. H. Espy et al., "Persulfates as Repulping Reagents for Neutral/Alkaline Wet-strength Broke", *Tappi Journal*, Vol. 76, No. 2, pp. 139–141 (February 1993) and P. C. Kapadia et al., "A Non-Chlorine Repulping Aide", (1992 Tappi Papermakers Conference) show significant reductions in organic chlorides using peracid salts.

Peroxide compounds alone, such as hydrogen peroxide and peracetic acid, and combined with non-alkali, non-alkaline earth metal salts and/or metal chelates have also been proposed as repulping reagents as disclosed in J. Sajbel et al., U.S. patent application Ser. No. 08/112,779 filed on Aug. 26, 1993, the entire disclosure of which is incorporated herein by reference.

Repulping reagents, especially persulfates and peroxymonosulfates, are typically employed in a single pH environment, most commonly under strongly alkaline conditions (i.e. pH of 10–13) at temperatures of at least 50° C. However, these process conditions do not provide a high level of repulping, especially when repulping bleached paper with high levels of wet strength resin and unbleached paper broke or corrugated containers.

There is therefore a continuing need to improve the process of repulping paper using environmentally acceptable reagents which are effective in repulping wet strength paper, especially for the repulping of bleached paper and unbleached paper broke or corrugated containers.

3.0 SUMMARY OF THE INVENTION

The present invention is generally directed to a process for repulping wet strength paper in which an oxidizing agent, preferably a non-chlorinated oxidizing agent, is used to oxidize the wet strength resin in the wet strength paper. The process is conducted initially under a first pH environment until the wet strength paper in the slurry begins to breakdown into fibers and the process is then continued under a second pH environment, wherein the second pH is higher than the first pH, until repulping is essentially complete.

In a preferred embodiment of the invention, the process comprises adjusting the pH of a slurry of the wet strength paper to no higher than about 8. The slurry is then heated to a reaction temperature. An oxidizing agent, preferably a non-chlorinated oxidizing agent, is added to the heated slurry which is mixed for a time sufficient to initiate the breakdown of the wet strength paper to fibers. The pH of the slurry is then adjusted to at least 10 and the slurry is mixed for a time sufficient to at least substantially complete the breakdown of the wet strength paper to fibers.

DETAILED DESCRIPTION OF THE INVENTION

The present invention provides for the repulping of wet strength paper in which the breakdown of the wet strength paper to fibers is initiated at a first pH environment and the remainder of the conversion of wet strength paper to fibers is conducted under higher pH conditions. In accordance with the invention, particularly difficult wet strength papers, such as bleached paper with high levels of wet strength resin and unbleached paper broke or corrugated cartons, can be effectively repulped.

The process is commenced by adjusting the pH of the slurry containing wet strength resin to a first pH value, typically about 8, preferably in the acidic range. The pH adjusting agent is typically an organic acid such as acetic acid or an inorganic acid such as hydrochloric acid or sulfuric acid.

During the first pH adjusting step described above, it may be desirable to add a surfactant (rewetting agent) and/or a defoamer to the slurry. The surfactant desirably increases the wetting of the wet strength paper by lowering the surface tension of the slurry and, preferably, does not produce foam during the repulping process. Preferred surfactants include linear and branched phenol ethoxylates and propoxylates, linear and branched alcohol ethoxylates and propoxylates, and block copolymers of ethylene oxide and propylene oxide. Suitable surfactants are commercially available and are sold under the tradename Nopcowets 160, 165, 201, 1529B, 1529T and 6735 from Henkel Corporation, Paper Chemicals Division.

Defoamers may be used in the present invention to prevent, or at least reduce, foaming and reduce the surface tension of the repulping liquor and thereby increase the wetting of the paper. Typical defoamers for use in the present process contain varying amounts of silicone in the form of an emulsion, water, mineral oil, hydrophobic silica, non-ionic surfactants and optional additives such as acrylic polymers and alkali metal hydroxides. Examples of suitable commercial defoamers are Foamasters 1119B, 2107H, 2107J, 2919T, and 5470 available from Henkel Corporation, Paper Chemicals Division.

The pH adjusted slurry is then heated to a reaction temperature, typically in the range of from about 25° to 100° C., preferably from about 50° to 80° C., most preferably about 70° C.

An oxidizing agent such as sodium persulfate, sodium peroxymonosulfate, hydrogen peroxide and peracetic acid is then added. The afore-mentioned oxidizing agents may be used alone or combined with suitable amounts of a non-alkali, non-alkaline earth metal salt or metal chelate. The amount of the oxidizing agent is typically in the range of at least 0.1% by weight based on the dry weight of the wet strength paper.

The slurry is then mixed for at least 15 minutes, typically about 30 to 60 minutes to initiate breakdown of the fibers. Thereafter the pH of the slurry is adjusted to at least 10 with a base such as sodium hydroxide and the slurry is then mixed for at least 15 minutes to substantially complete the breakdown of the paper to fiber.

The following examples are illustrative of embodiments of the invention and are not intended to limit the invention as encompassed by the claims forming part of the application.

EXAMPLE 1

In a 4 liter stainless beaker equipped with stirrer and thermometer, were added 1960 grams water, 0.2 gram of a surfactant (Nopcowet-160 made by Henkel Corporation), 0.1 gram of a defoamer (Foamaster-5470 made by Henkel Corporation) and 40 grams of 1"×1" cut unbleached liner board containing polyaminoamideepichlorohydrin (PAAE) resin. The pH of the aqueous slurry was adjusted to 3.0 with 37% hydrochloric acid and heated to 70° C. over 30 minutes. At 70° C., 1 gram of a peroxymonosulfate oxidizing agent (Oxone made by DuPont) was added and the temperature was maintained for 60 minutes at pH 3. Thereafter, the pH was adjusted to 11 with 25% NaOH and held for another 30 minutes. The paper slurry was mixed for 3 minutes in a Tappi-Type disintegrator (Tappi Method T-205 Om-88, section 7.1.1) and a sample was removed for filtering in a Somersville Fractionator having a 0.15 mm slotted screen. Residuals were collected, dried overnight at 105° C., and the amount of repulped paper measured. The results are shown in Table 1.

TABLE 1

Paper A, Unbleached Liner Board (Polyaminoamide-Epichlorohydrin Resin)

| Example Number | Oxidizer Type[1] | % on Paper | % Rewet Agent | Temp °C. | Step I pH | Step I min | Step II pH | Step II min | % Repulp |
|---|---|---|---|---|---|---|---|---|---|
| 1 | MPS | 2.5 | 0.01[2] | 70 | 3 | 60 | 11 | 30 | 85 |
| 2 | MPS | 2.5 | 0.01[2] | 70 | 3 | 30 | 11 | 30 | 79 |
| 3 | MPS | 2.5 | 0.01[2] | 70 | 7 | 60 | 11 | 30 | 82 |
| 4 | MPS | 2.5 | — | 70 | 3 | 60 | 11 | 60 | 78 |
| 5 | MPS | 2.5 | 0.10[3] | 70 | 3 | 30 | 11 | 30 | 75 |
| 6 | MPS | 10.0 | — | 70 | 3 | 30 | 11 | 30 | 89 |
| 7 | $H_2O_2$ | 10.0 | — | 70 | 3 | 30 | 11 | 30 | 84 |
| 8 | APS | 10.0 | — | 70 | 3 | 30 | 11 | 30 | 74 |
| 9 | MPS | 2.5 | 0.01[2] | 80 | 3 | 60 | 11 | 30 | 83 |
| 10 | MPS | 2.5 | 0.01[2] | 70 | 3 | 30 | 11 | 60 | 79 |
| COMP. A | MPS | 10.0 | — | 70 | — | — | 11 | 60 | 61 |
| COMP. B | APS | 10.0 | — | 70 | — | — | 11 | 60 | 58 |
| COMP. C | — | — | — | 70 | 3 | 30 | 11 | 30 | 32 |

[1]MPS = Oxone (DuPont), APS = Ammonium Persulfate (Aldrich) $H_2O_2$ = hydrogen peroxide (Aldrich)
[2]Nopcowet-160 (Henkel Corporation), % on volume
[3]Pluronic 31R-1 (BASF Corporation), % on volume As shown in Example 1, 85% of the sample was repulped during the course of the 90 minute treatment.

EXAMPLES 2–10

Example 1 was repeated using the oxidizing agents and process conditions shown in Table 1. At the conclusion of the process, the percent of repulping ranged from 74 to 89%.

COMPARATIVE EXAMPLE A

In a 4 liter stainless beaker equipped with stirrer and thermometer, was added 1960 grams water and 40 grams of 1"×1" cut unbleached liner board containing Polyaminoamide-epichlorohydrin (PAAE) resin. The pH of the aqueous slurry was adjusted to 11 with 25% NaOH and heated to 70° C. over 30 minutes. At 70° C., 4 grams of Oxone were added and the temperature was maintained for 60 minutes. The paper slurry was then mixed for 3 minutes in a Tappi-Type disintegrator (Tappi Method T-205 Om-88, section 7.1.1)

and a sample was removed for filtering in a Somersville Fractionator having a 0.15 mm slotted screen. Residuals were collected, dried overnight at 105° C., and the amount of repulped paper was measured. The results are shown in Table 1.

As shown in Table 1, the pH of the slurry was adjusted to 11 in a single step so that repulping was conducted solely under alkaline conditions, as is conventional in the repulping of paper. The percent of repulping was only 61%.

COMPARATIVE EXAMPLE B

Comparative Example A was repeated using ammonium persulfate as the oxidizing agent instead of Oxone (monopersulfate). As shown in Table 1, the percent of repulping (58%) was similar to that obtained for comparative Example A.

COMPARATIVE EXAMPLE C

The procedure of Examples 6 and 8 was repeated in the absence of an oxidizing agent. As shown in Table 1, the percent of repulping was only 32%.

PREPARATION OF AN IRON-CHELATE COMPLEX

An iron-chelate complex was prepared by dissolving 1.0 gram of iron sulfate hydrated with 7 moles of water in 97.5 grams of water. 4.5 grams of an aqueous solution of pentasodium salt of diethylenetriamine pentaacetic acid was added to the iron sulfate solution and the pH was adjusted to 3.6 with 0.7 gram of hydrochloric acid (37% solution). The resulting solution contained 1920 parts per million of chelated iron.

EXAMPLES 11–21

Example 1 was repeated using the oxidizing agents shown in Table 2 with or without a surfactant (rewetting agent).

As shown in Table 2, Examples 11–21 provide excellent repulping in the range of 75% to 89%.

COMPARATIVE EXAMPLES D AND E

Example 13 and 16, respectively, were repeated except that the process was conducted in a single step at a pH of 11 so that repulping was conducted solely under alkaline conditions. As shown in Table 2 the percentage of repulping was only 66%.

EXAMPLES 22–25

Example 1 was repeated using the oxidizing agent and process conditions shown in Table 3.

TABLE 3

Paper C[3], Unbleached Liner Board
(Polyamine-Epichlorohydrin Resin)

| Example Number | Oxidizer Type[1] | % on Paper | Temp °C. | Step I pH | Step I min | Step II pH | Step II min | % Re-pulp |
|---|---|---|---|---|---|---|---|---|
| 22[2] | $H_2O_2$ | 10.0 | 70 | 4 | 30 | 11 | 30 | 94 |
| 23 | $H_2O_2$ | 1.0 | 70 | 4 | 30 | 11 | 30 | 87 |
| 24 | MPS | 10.0 | 70 | 4 | 30 | 11 | 30 | 88 |
| 25[2] | APS | 10.0 | 70 | 4 | 30 | 11 | 30 | 82 |
| COMP. F | MPS | 10.0 | 70 | — | — | 11 | 60 | 77 |
| COMP. G | APS | 10.0 | 70 | — | — | 11 | 60 | 74 |
| COMP. H | — | — | 70 | — | — | 11 | 60 | 64 |

[1]MPS = Oxone (DuPont), APS = Ammonium Persulfate (Aldrich) $H_2O_2$ = hydrogen peroxide (Aldrich)
[2]2 ppm iron-chelate
[3]Paper C is the same type of paper product as Paper A (identified in Examples 1–10 and Table 1) and Paper B (identified in Examples 11–21 and Table 2), but is obtained from a different source.

As shown in Table 3, Examples 22–25 exhibited repulping in the range from 82% to 94% repulping.

TABLE 2

Paper B[4], Unbleached Liner Board (Polyaminoamide-Epichlorohydrin Resin)

| Example Number | Oxidizer Type[1] | % on Paper | % Rewet Agent | Temp °C. | Step I pH | Step I min | Step II pH | Step II min | % Repulp |
|---|---|---|---|---|---|---|---|---|---|
| 11 | MPS | 2.5 | 0.1[2] | 70 | 4 | 30 | 11 | 30 | 89 |
| 12 | MPS | 1.0 | 0.1[2] | 70 | 4 | 30 | 11 | 30 | 84 |
| 13 | MPS | 1.0 | — | 70 | 4 | 30 | 11 | 30 | 75 |
| 14 | APS | 2.5 | 0.1[2] | 70 | 4 | 30 | 11 | 30 | 83 |
| 15 | APS | 1.0 | 0.1[2] | 70 | 4 | 30 | 11 | 30 | 80 |
| 16 | APS | 1.0 | — | 70 | 4 | 30 | 11 | 30 | 79 |
| 17 | $H_2O_2$ | 2.5 | 0.1[2] | 70 | 4 | 30 | 11 | 30 | 86 |
| 18 | $H_2O_2$ | 1.0 | 0.1[2] | 70 | 4 | 30 | 11 | 30 | 82 |
| 19 | $H_2O_2$ | 1.0 | — | 70 | 4 | 30 | 11 | 30 | 75 |
| 20[3] | $H_2O_2$ | 1.0 | 0.1[2] | 50 | 4 | 30 | 11 | 30 | 77 |
| 20[3] | APS | 1.0 | 0.1[2] | 50 | 4 | 30 | 11 | 30 | 76 |
| COMP. D | MPS | 1.0 | — | 70 | — | — | 11 | 60 | 66 |
| COMP. E | APS | 1.0 | — | 70 | — | — | 11 | 60 | 66 |

[1]MPS = Oxone (DuPont), APS = Ammonium Persulfate (Aldrich) $H_2O_2$ = hydrogen peroxide (Aldrich)
[2]Pluronic 31R-1 (BASF Corporation), % on volume
[3]2 ppm iron-chelate
[4]Paper B is the same type of paper product as Paper A (identified in Examples 1–10 and Table 1), but obtained from a different source.

COMPARATIVE EXAMPLES F AND G

Examples 24 and 25 were repeated except that the repulping process was conducted in a single step at a pH of 11 so that repulping was conducted solely under alkaline conditions. As shown in Table 3, the percent of repulping (77% and 74%) was significantly below the results obtained (88% and 82% repulping) in accordance with Examples 24 and 25, respectively.

COMPARATIVE EXAMPLE H

The repulping process of Example 1 was repeated in the absence of an oxidizing agent and the repulping process was conducted for 60 minutes in a single step at a pH of 11 so that repulping was conducted solely under alkaline conditions. As shown in Table 3, the percentage of repulping was only 64%.

EXAMPLES 26–28

Example 1 was repeated for the purpose of repulping bleached poster board using the oxidizing agent and the process conditions shown in Table 4.

TABLE 4

Paper D, Bleached Poster Board
(Polyaminoamide-Epichlorohydrin Resin)

| Example Number | Oxidizer Type[1] | % on Paper | Temp °C. | Step I pH | Step I min | Step II pH | Step II min | % Repulp |
|---|---|---|---|---|---|---|---|---|
| 26[2] | $H_2O_2$ | 2.5 | 70 | 7 | 30 | 11 | 30 | 88 |
| 27[2] | APS | 2.5 | 70 | 7 | 30 | 11 | 30 | 93 |
| 28[2] | MPS | 2.5 | 70 | 7 | 30 | 11 | 30 | 89 |
| COMP. I | MPS | 2.5 | 70 | — | — | 12 | 60 | 58 |
| COMP. J | APS | 2.5 | 70 | — | — | 11 | 60 | 56 |
| COMP. K | — | — | 70 | — | — | 12 | 60 | 48 |

[1]MPS = Oxone (DuPont), APS = Ammonium Persulfate (Aldrich) $H_2O_2$ = hydrogen peroxide (Aldrich)
[2]2 ppm iron-chelate As shown in Table 4, Examples 26–28 exhibited excellent repulping in the range of from 88% to 93%.

COMPARATIVE EXAMPLES I AND J

The process of Examples 26–28 was repeated using the oxidizing agents and process conditions shown in Table 4. In each of the comparative examples, the process was run solely under alkaline conditions. As shown in Table 4, the percentage of repulping was only 56% to 58%.

COMPARATIVE EXAMPLE K

The repulping process of Example 1 was repeated in the absence of an oxidizing agent and in a single step under solely alkaline conditions. As shown in Table 4, the percentage of repulping was only 48%.

As shown in the examples described above, the process of the present invention in which the wet strength paper undergoes initial breakdown to fibers under a first pH environment and at least substantially complete conversion to fibers under a second, higher pH environment is more effective in the repulping of paper than the standard practice of repulping solely under single pH conditions.

What we claim is:

1. A process for repulping unbleached wet strength paper containing at least one wet strength resin comprising:
   (a) repulping the wet strength paper in a slurry containing at least 0.1% by weight of a non-chlorinated oxidizing agent selected from the group consisting of persulfates and peroxymonosulfates based on the dry weight of the wet strength paper and having a first pH to initiate the breakdown of the paper to fibers wherein said slurry is heated to a reaction temperature of from about 25° C. to 100° C.; and
   (b) repulping the slurry in step (a) at a second pH which is higher than the first pH until conversion of the wet strength paper is at least substantially complete.

2. The process of claim 1 wherein the first pH is no greater than about 8.

3. The process of claim 1 wherein the second pH is at least about 10.

4. The process of claim 1 wherein the reaction temperature is in the range of from about 50° to 80° C.

5. The process of claim 1 further comprising adding a defoamer to the slurry.

6. The process of claim 1 further comprising adding an effective amount of a surfactant to the slurry sufficient to lower the surface tension of the slurry.

7. The process of claim 6 wherein the surfactant is selected from the group consisting of linear and branched phenol ethoxylates and propoxylates, linear and branched alcohol ethoxylates and propoxylates, and block copolymers of ethylene oxide and propylene oxide.

8. The process of claim 6 further comprising adding a defoamer to the slurry.

9. The process of claim 1 comprising:
   (i) adjusting the pH of the slurry of the wet strength paper of step (a) to no higher than about 8;
   (ii) heating the slurry to said reaction temperature;
   (iii) adding an oxidizing effective amount of said oxidizing agent to the heated slurry;
   (iv) mixing the slurry for a time sufficient to initiate breakdown of the wet strength paper to fibers;
   (v) adjusting the pH of the slurry of step (b) to at least 10; and
   (vi) mixing the slurry for a time sufficient to at least substantially complete the breakdown of the wet strength paper to fibers.

10. The process of claim 9 wherein in step (i) the pH of the slurry is adjusted to no higher than 7.

11. The process of claim 9 wherein step (i) is conducted under acidic conditions.

12. The process of claim 9 wherein step (v) is conducted at a pH in the range of from about 10 to 13.

13. The process of claim 9 wherein step (i) is conducted at a pH of about 4 and step (v) is conducted at a pH of about 11.

14. A process for repulping unbleached wet strength paper containing at least one wet strength resin comprising:
   (a) adjusting the pH of a slurry of the wet strength paper to no higher than about 8 in the presence of at least one additive selected from the group consisting of surfactants and defoamers;

(b) heating the slurry to a temperature in the range of from about 50° C. to 80° C.;

(c) adding at least 0.1% by weight, based on the dry weight of the wet strength paper, of a non-chlorinated oxidizing agent selected from the group consisting of persulfates and peroxymonosulfates to the heated slurry;

(d) mixing the slurry for a time sufficient to initiate breakdown of the wet strength paper to fibers;

(e) adjusting the pH of the slurry to a pH of at least about 10; and (f) mixing the slurry for a time sufficient to at least substantially complete the breakdown of the wet strength paper to fibers.

* * * * *